C. M. FEIST.

SELF LUBRICATING AXLE.

APPLICATION FILED JULY 29, 1920.

1,383,090. Patented June 28, 1921.

Inventor

Charles M. Feist,

Witnesses

Chas. S. Hoyer

By

Attorney

UNITED STATES PATENT OFFICE.

CHARLES M. FEIST, OF SIOUX CITY, IOWA.

SELF-LUBRICATING AXLE.

1,383,090. Specification of Letters Patent. Patented June 28, 1921.

Application filed July 29, 1920. Serial No. 399,840.

*To all whom it may concern:*

Be it known that I, CHARLES M. FEIST, a citizen of the United States, residing at Sioux City, in the county of Woodbury and State of Iowa, have invented new and useful Improvements in Self-Lubricating Axles, of which the following is a specification.

This invention relates to wheels and bearings of that type having self-lubricating characteristics, and particularly trolley wheels, meat-hook or carrying wheels, fire and factory door wheels, hay apparatus and other analogous wheels, and the general object of the invention is to provide a light, strong and durable, and cheap hollow bearing adapted to have a fixed mounting for receiving the wheel thereon, the bearing being ventilated or maintained in comparatively cool condition during operation of the wheel. A specific object of the invention is to provide a bearing of the type above noted having a particular form of lubricant-holding means fixed therein and occupying a material portion of the interior space thereof, and also to so mount this bearing that it may be readily removed from its supporting means. A still further specific object of the invention is to provide a bearing of the class specified having a bearing surface which accurately fits within a wheel hub and also to provide for an efficient electrical contact between the wheel and bearing and supporting means therefor, and to so arrange the lubricant in the bearing or axle that it will not in the least interfere with the electrical contact between the wheel and the bearing or axle.

With these and other objects and advantages in view, the invention consists in the construction and arrangement of parts which will be more fully hereinafter described and claimed.

The present invention is an improvement on the wheels and bearings or axles disclosed by my prior Patents, No. 796,829, of August 8, 1905, No. 1,172,965, of February 22, 1916, and No. 1,344,495, of June 22, 1920.

The accompanying drawing illustrates the improved bearing or axle applied to an electrical trolley wheel harp and pole to demonstrate one particularly preferred application thereof, and in the following description the bearing or axle will be disclosed in detail in connection with such type of trolley wheel to present one practical illustration of the advantages of the improvements. The features of improvement, however, are equally well applicable to other forms of bearings and wheels, and will be adopted in the latter.

Figures 1, 2, 3, 4:
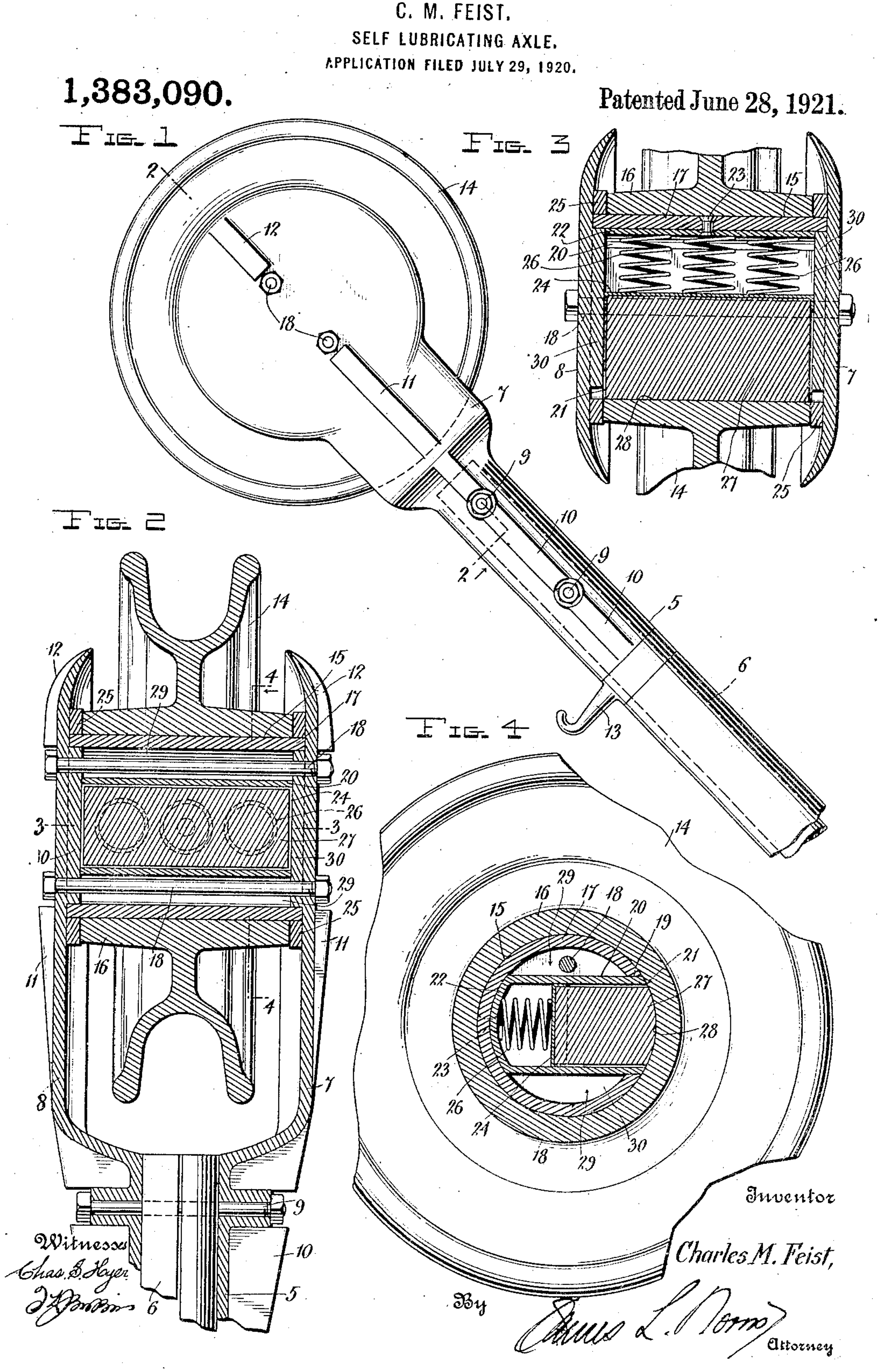
Figure 1 represents a side elevation showing a trolley wheel and harp and a portion of a pole embodying the features of the present invention.
Fig. 2 represents a transverse section on an enlarged scale taken on the line 2—2, Fig. 1.
Fig. 3 is a section taken on the line 3—3, Fig. 2.
Fig. 4 is a section taken on the line 4—4, Fig. 2, showing a part of the trolley wheel in side elevation.

The numeral 5 designates a socket at the upper end of the usual form of trolley pole 6, said socket having a pair of socketed jaws or sections 7 and 8 of duplicate construction extending therefrom and providing halves of the harp. The trolley pole 6 is secured in the socket by transverse bolts or analogous fastenings 9, and disposed well up on the socket, are combined guard and reinforcing ribs 10 projecting outwardly from diametrically opposite portions of the upper part of the socket and also continuing upwardly over the centers of the harp halves or members 7 and 8, as at 11 and 12. The ribs 11 and 12 are separated at their inner terminals to clear the centers of the harp halves or members for a purpose which will be presently explained. The ribs 10, 11 and 12 also have another particular function, and that is to prevent the bolt heads and nuts from hooking on overhead wires, the said ribs standing out far enough and having such shape as to cause the wires to clear the said bolt heads and nuts which serve as the fastening means for the several parts of the improved device. At a suitable point on the socket 5 a rope swivel 13 is mounted and has a well understood function.

The harp is recessed or the halves 7 and 8 thereof are spaced such relative distances as to receive a grooved trolley wheel 14 which has an enlarged central eye or cylindrical bore 15 of equal diameter throughout its length, the said eye or bore being formed through a hub 16. The hub is rotatably mounted and closely fitted on a spool-like bearing or axle 17 of equal diameter throughout its length and held fixed between the harp halves or sections 7 and 8 by removable bolts 18 extending transversely through the said harp halves or sections and the bearing or axle above and below the longitudinal center of the latter. The bearing or axle 17 is of shell-like form or is primarily tubular and constructed of hard metal or steel, but by its tubular form is rendered comparatively light in weight. The tubular bearing or axle 17 has an opening 19 cut therethrough and extending full length of the same, or from end to end thereof, and secured within this bearing or axle is a casing 20 of substantially rectangular form having one end fully open as at 21 and secured in the opening 19 of the bearing or axle, as clearly shown by Fig. 4. The opposite end 22 of the casing 20 is closed and conforms in contour to the inner surface of the bearing or axle against which it is snugly fitted and is held fast by rivets or fastenings 23 passing through the said end 22 and the adjacent portion of the bearing or axle 17. The terminals of the open end 21 are dressed off flush with the outer surface of the bearing or axle 17 so as to avoid the least projection thereof beyond the said axle surface. Within the casing 20 a holder 24 is mounted to freely slide and is engaged by spiral springs 26 interposed between the same and the closed end 22 of the casing. The springs 26 tend to force the holder 24 outwardly through the open end 21 of the casing 20, and in this holder a lubricating block 27 of suitable material is removably held and has an outer convex surface 28 conforming in curvature to the bore 15 of the wheel hub 16 and whereby the wheel may be automatically lubricated. The casing 20 occupies only a portion of the interior space of the tubular bearing or axle 17 to effect the desirable ventilating character of the bearing or axle, or to provide for air chambers at opposite sides of the casing 20 as at 29 containing air, which will materially reduce the heating tendency of the bearing or axle. The opposite inner sides of the harp halves or sections 7 and 8 adjacent to their upper terminals are formed with inwardly projecting circular closing bosses 30 which snugly fit in the opposite open ends of the tubular bearing or axle 17 and set up a reliable electrical contact between the said bearing or axle and the harp halves or sections and also provide for a positive placement of the bearing or axle, and the bolts 18 are inserted through the harp halves or sections and the bosses and also through the chambers 29 of the bearing or axle at opposite sides of the casing 20. Between the opposite ends of the hub 16 of the wheel 14 and the adjacent inner surfaces of the harp halves or sections 7 and 8 washers 25 are interposed, said washers being preferably formed of fiber or other antifrictional material. These washers prevent cutting of the bearing or axle or undue wear by the wheel hub on the said axle or bearing at the opposite end edges thereof.

The improved bearing or axle, wheel and harp halves or sections may be readily and easily associated, and, if necessary, the parts may be conveniently separated simply by removing the bolts 18. In the operation of the lubricating part of the improved bearing or axle the lubricating block 27 is forced outwardly through the open end of the casing 20 and is brought in contact with the bore 15 of the wheel hub 16 to thereby thoroughly lubricate the hub and effect an easy running of the wheel 14 on the bearing or axle. The lubricating block 27 will be fed automatically or continuously projected as it wears down by the springs 26, and when it has become fully used it may be replaced by removing the unused portion and inserting a new block in the holder 24.

The improved form of trolley wheel and bearing or axle, whether used in connection with overhead trolley wires or electrical conductors or with other wheels, materially reduces the cost of construction of bearings or axles of this type and particularly self-lubricating bearings, and the comparative lightness of the improved bearing or axle, which is made possible by the specific construction thereof as hereinbefore explained, is also of material advantage in organizations of this class, and at the same time the necessary strength and durability of the bearing or axle is maintained.

What is claimed is:

1. A wheel bearing of the class specified, consisting of a cylindrical tubular body having an opening in the side wall thereof, a casing extending diametrically across and partially occupying the interior space of the body, the inner end of the casing being closed and the outer end open and extending through and coinciding with the opening in the side wall of the body, and an automatically operating lubricating means mounted in the casing.

2. A bearing of the class specified consisting of a cylindrical shell-like tubular body, a casing extending diametrically across the interior of the body and occupying only a portion of the interior space of the latter, an automatically movable holder mounted in the casing, the casing opening through the outer surface of the body, and a lubricant carried by the said holder.

3. In a device of the class specified, the combination of a wheel bearing of cylindrical tubular form having an opening therethrough and also open at opposite ends, a casing inclosed within the body and extending diametrically across the latter and having one end open and extending through the opening of the bearing and terminating flush with the outer side of the bearing, a lubricating means automatically movable within the casing and projectable through the open end of the said casing, supporting means for the bearing having portions fitting in the open ends of said bearing, bolts transversely and removably inserted through the supporting means and the bearing at opposite sides of the casing, and a wheel rotatably mounted on the bearing.

4. In a device of the class specified, a bearing of tubular form having open ends, a casing inclosed within and extending across the interior of the bearing and opening through the latter, an automatically movable lubricating means mounted in the casing, a wheel having a hub rotatably engaging the bearing, and supporting means for the bearing secured against opposite ends thereof.

In testimony whereof I have hereunto set my hand in presence of two subscribing witnesses.

CHARLES M. FEIST.

Witnesses:
D. De Beer,
H. B. Gregory.